United States Patent
Biggs et al.

(10) Patent No.: US 10,382,399 B2
(45) Date of Patent: Aug. 13, 2019

(54) PROVIDING AN OPERATING SYSTEM SESSION

(71) Applicant: Hewlett-Packard Development Company, L.P., Houston, TX (US)

(72) Inventors: Kent E Biggs, Tomball, TX (US); Lorri L Jefferson, Tomball, TX (US); Tom Bonola, Cypress, TX (US); Derek L Everett, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 54 days.

(21) Appl. No.: 15/124,653

(22) PCT Filed: Mar. 10, 2014

(86) PCT No.: PCT/US2014/022371
§ 371 (c)(1),
(2) Date: Sep. 8, 2016

(87) PCT Pub. No.: WO2015/137907
PCT Pub. Date: Sep. 17, 2015

(65) Prior Publication Data
US 2017/0019374 A1    Jan. 19, 2017

(51) Int. Cl.
*G06F 9/00* (2006.01)
*G06F 15/16* (2006.01)
(Continued)

(52) U.S. Cl.
CPC ........ *H04L 63/0272* (2013.01); *G06F 21/606* (2013.01); *H04L 63/04* (2013.01)

(58) Field of Classification Search
CPC combination set(s) only.
See application file for complete search history.

(56) References Cited

U.S. PATENT DOCUMENTS

2003/0208595 A1* 11/2003 Gouge .................... H04L 67/16
                                                              709/225
2005/0159158 A1*  7/2005 Pardeep ............ H04W 36/0066
                                                              455/436
(Continued)

FOREIGN PATENT DOCUMENTS

KR    10-2010-0074073 A    7/2010
TW         201141126 A    11/2011

OTHER PUBLICATIONS

"Integrating Bring Your Own Device Using Virtual Desktops," Jan. 5, 2013, pp. 1-3, Apps4Rent LLC.
(Continued)

*Primary Examiner* — Phy Anh T Vu
(74) *Attorney, Agent, or Firm* — HP Inc. Patent Department (57) ABSTRACT

In an example implementation according to aspects of the present disclosure, a method may include establishing, by a host computing system, a secure connection to a user computing system via a wireless network, wherein the host computing system and the user computing system are in physical proximity to each other. The example method further includes providing, by a host computing system, an operating system session to the user computing system through the secure connection while the host computing system and the user computing system remain in physical proximity to each other. The example method also includes providing, by a host computing system, data associated with a user of the user computing system to the user computing system via the operating system session through the secure connection, wherein the data associated with the user of the user computing device is stored in a data store of the host computing system.

9 Claims, 3 Drawing Sheets

(51) Int. Cl.
*H04L 29/06* (2006.01)
*G06F 21/60* (2013.01)

(56) References Cited

U.S. PATENT DOCUMENTS

| | | | |
|---|---|---|---|
| 2006/0143703 A1* | 6/2006 | Hopen | G06F 21/6218 726/15 |
| 2009/0287765 A1 | 11/2009 | Hamilton et al. | |
| 2012/0179731 A1 | 7/2012 | Lin et al. | |
| 2013/0091557 A1 | 4/2013 | Gurrapu | |
| 2014/0006347 A1* | 1/2014 | Qureshi | G06F 21/10 707/621 |
| 2014/0040995 A1* | 2/2014 | Bursell | G06F 21/44 726/4 |
| 2014/0094118 A1* | 4/2014 | Cudak | H04W 4/80 455/41.1 |
| 2014/0173692 A1* | 6/2014 | Srinivasan | H04W 12/02 726/4 |
| 2014/0267569 A1* | 9/2014 | Periyannan | H04L 65/605 348/14.08 |
| 2014/0324572 A1* | 10/2014 | Ramer | G06Q 30/02 705/14.46 |
| 2014/0344446 A1* | 11/2014 | Rjeili | H04L 43/04 709/224 |
| 2014/0359709 A1* | 12/2014 | Nassar | H04L 65/1083 726/4 |
| 2017/0063987 A1* | 3/2017 | Brooks | H04L 67/1095 |
| 2017/0324572 A1* | 11/2017 | Biggs | H04L 12/18 |

OTHER PUBLICATIONS

"Providing the Right Solutions for Your Virtual Desktop and Server Needs," Sep. 21, 2012, pp. 1-3, NexWave Solutions Ltd.

Peter Wilkins, "Citrix Synergy 2013: Apps and Data Anytime, Anyplace, Anywhere," May 28, 2013, pp. 1-2, Centralis.

Youhui Zhang et al., "Portable Desktop Applications Based on User-level Virtualization," 2008, pp. 1-6, IEEE.

* cited by examiner

PROVIDING AN OPERATING SYSTEM SESSION

BACKGROUND

Computing devices such as laptops, smart phones, and tablets have increased in popularity. Many individuals own at least one (if not multiple) of these types devices, which may frequently be used for personal tasks such as checking email, browsing the Internet, taking photos, playing games, and other such activities. Additionally, these devices are also being used to perform basic business related tasks, such as email, accessing business web services, and internet browsing.

BRIEF DESCRIPTION OF THE DRAWINGS

The following detailed description references the drawings, in which.

DETAILED DESCRIPTION

Many enterprise business users desire to use their own personal computing devices, such as smart phones, tablets, laptops, and desktops, in an enterprise environment (i.e., within the enterprise IT infrastructure). These devices are referred to as "bring your own device" or BYOD devices. The BYOD devices may run an operating system or applications that are not supported by the enterprise environment. For example, these BYOD devices may have Android, Chrome, iOS, or other operation systems commonly associated with such devices. Such operating systems may not integrate well (or at all) with the enterprise environment. For example, certain applications or data executing on or stored within the enterprise environment may be inaccessible to BYOD devices because the BYOD devices' operating systems cannot connect to or interface with the enterprise environment. Additionally, the variety of operating systems can cause user frustration with having to learn new or different types of operating system interfaces.

Moreover, the addition of BYOD devices in the enterprise environment introduces security concerns. For example, a user's device may contain malicious code such as a software virus. Once the BYOD device is connected to the enterprise environment, the malicious code could propagate through the enterprise environment to harm other connected hardware. Another security concern is data security. Enterprise customers do not want their data, such as presentations, specifications and email, stored on a BYOD device.

BYOD devices also increase the complexity of the enterprise environment by adding additional types of devices that are to be supported within the enterprise environment. Enterprise environment administrators must deploy device management applications, help desk support, software updates, and security devices to accommodate the variety of BYOD devices within the enterprise environment.

Currently, an enterprise environment may support BYOD devices by employing a variety of desktop virtualization approaches. In this case, the BYOD devices connect to the enterprise environment using a hosted or virtual desktop environment that is hosted virtually on a server within the enterprise environment. While this provides a secure connection to the enterprise environment, the solution is dependent upon the health and consistency of the secure connection. If the secure connection fails (e.g., the network or Internet goes down), the virtual desktop environment is unavailable. Another virtualization approach is offline caching mode, whereby when a connection to the virtualized environment is not available, the last experience is cached offline on the BYOD device and synced back when connection becomes available. This also raises security concerns because the data is no longer secured only in the data center, but it is also propagated to the BYOD devices.

Various implementations will be described below by referring to several examples of wirelessly providing an operating system session from a host computing system to a user computing system when the host computing system and the user computing system are in physical proximity. For example, a host computing system may establish a secure connection to a user computing system in response to receiving a secure connection request from the user computing system, wherein the host computing system and the user computing system are in physical proximity to each other. The host computing system may then provide an operating system session to the user computing system through the secure connection while the host computing system and the user computing system remain in physical proximity to each other, wherein the operating system is stored on and executable by the host computing system. The host computing system may also provide data associated with a user of the user computing system to the user computing system via the operating system session through the secure connection, wherein the data associated with the user of the user computing device is stored in a data store of the host computing system. Additional examples are described below.

In some implementations, BYOD devices may be provided an operating system session even if the host computing device cannot connect to the enterprise environment. A user of a BYOD device may continue to access his data even when the host computing device cannot connect to the enterprise environment. Additionally, a common user operating system interface, such as a Microsoft® Windows® operating system, may be provided. Security, management, and compatibility issues are also reduced or eliminated with the host computing system of the present disclosure. These and other advantages will be apparent from the description that follows.

Figure 1:
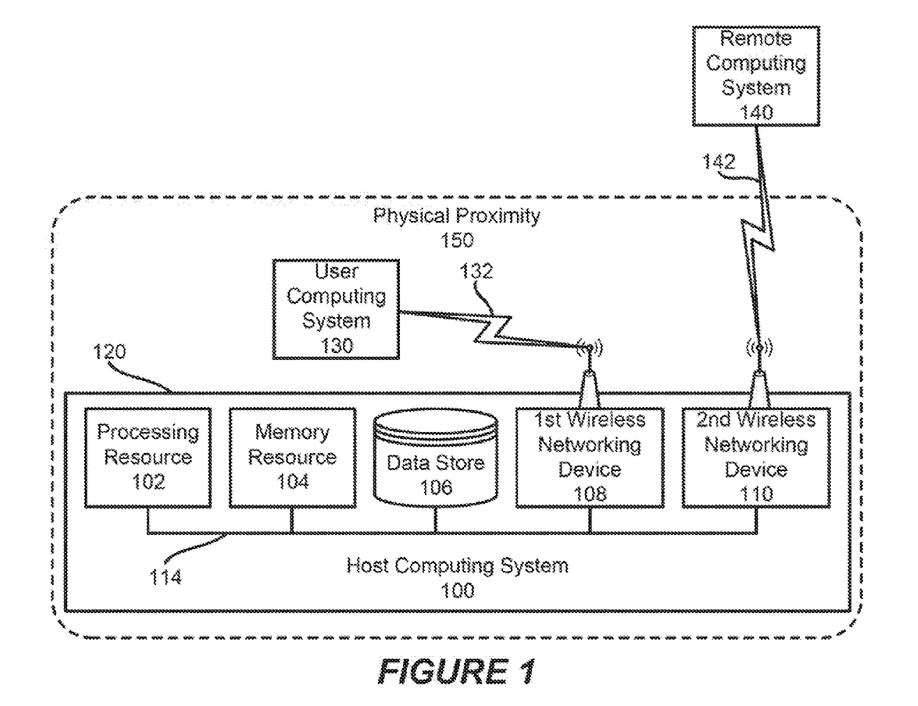
FIG. 1 illustrates a block diagram of a host computing system for wirelessly providing an operating system session to a user computing system in physical proximity to the host computing system via a secure connection according to examples of the present disclosure.

FIG. 1 illustrates a block diagram of a host computing system 100 for wirelessly providing an operating system session to a user computing system 130 in physical proximity 150 to the host computing system 100 via a secure connection 132 according to examples of the present disclosure. FIG. 1 includes particular components, modules, etc. according to various examples. However, in different implementations, more, fewer, and/or other components, modules, arrangements of components/modules, etc. may be used according to the teachings described herein. In addition, various components, modules, etc. described herein may be implemented as software modules, hardware modules, special-purpose hardware (e.g., application specific hardware, application specific integrated circuits (ASICs), embedded controllers, hardwired circuitry, etc.), or some combination of these.

The host computing system 100 may include a processing resource 102 that represents generally any suitable type or form of processing unit or units capable of processing data or interpreting and executing instructions. The instructions may be stored on a non-transitory tangible computer-readable storage medium, such as memory resource 104, or on a separate device (not shown), or on any other type of volatile or non-volatile memory that stores instructions to cause a programmable processor to perform the techniques described herein. Alternatively or additionally, the host computing system 100 may include dedicated hardware, such as integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

In addition to the processing resource 102 and the memory resource 104, the host computing system 100 may include a data store 106 for storing a variety of data. For example, the data store 106 stores user data relating to the user of the user computing system 130. The user data may include emails, documents, photographs, and other data associated with the user of the user computing system 130. In addition, the data store 106 stores an operating system that is executable by the processing resource 102. For example, the data store 106 may include data and instructions that, when executed by the processing resource 102, cause the host computing system 100 to run an operating system session. The operating system may be any one of a number of operating systems, such as a Microsoft® Windows® operating system, an Apple® OS operating system, a Unix or Linux based operating system, an Android® operating system, and/or any other suitable operating system.

The host computing system 100 also includes a first wireless networking device 108 and a second wireless networking device 110 in the example illustrated in FIG. 1. However, in other examples, a single wireless networking device or additional networking devices may be utilized. In the example shown, the first wireless networking device 108 facilitates a first secure connection 132 to the user computing system 130 while the second wireless networking device 110 facilitates a second secure connection to a remote computing system 140. These two secure connections are discussed in more detail below.

The components described as making up the host computing system 100 (e.g., the processing resource 102, the memory resource 104, the data store 106, the first wireless networking device 108, and the second wireless networking device 110) are electronically coupled such as through wires, cabling, and/or electronic circuitry via a system bus 114 that may include a data bus to carry information, an address bus to determine where information should be sent, and a control bus to determine operation. In other examples, individual buses may be utilized rather than a combined system bus, and the term "system bus" should not be construed as limiting the type of bus or buses utilized in connecting the components of the host computing system.

The components making up the host computing system 100 are housed in a case 120 having no communications ports. In other words, no communications devices such as optical drives, USB devices including USB memory devices, display devices, input devices such as a keyboard or mouse, imaging device such as a printer or other similar communications devices can physically connect to the host computing system 100. However, in examples, certain of these devices may connect to the host computing system 100 wirelessly, such as through the first wireless networking device 108, the second wireless networking device 110, or other additional networking devices. By preventing such devices from physically connecting to the host computing system 100, the host computing system can be manufactured more economically, has less ports/parts that can break, and is more secure because unauthorized devices have no way of connecting to the host computing system 100.

In an example, the host computing system 100 includes a battery (not shown), which may be charged through a power port on the host computing system 100. However, the power port does not act as a communications port and is used merely to power and/or charge the host computing system 100.

A user computing system 130 that is in physical proximity 150 to the host computing system 100 is wirelessly communicatively coupleable to the host computing system 100. It should be understood that the user computing system 130 may include any appropriate type of computing device, including for example smartphones, tablets, desktops, laptops, workstations, servers, smart monitors, smart televisions, digital signage, scientific instruments, retail point of sale devices, video walls, imaging devices, peripherals, or the like. The user computing system 130 may include an operating system, such as Android®, Microsoft® Windows®, Apple® iOS®, or another suitable operating system.

The user computing system 130 connects wirelessly to the host computing system 100 via the first wireless networking device 108 of the host computing system 100 using a first secure connection. A user of the user computing system 100 may request the first secure connection with the host computing system 130. However, in other examples, such a request may occur automatically rather than at the request of the user. Once the request is received by the host computing system 100, the host computing system 100 establishes the first secure connection 132 to the user computing system 130 via the first wireless networking device 108.

In order to establish the secure connection 132, the user computing system 130 should be in a physical proximity 150 to the host computing system 100. The physical proximity 150 is shown in FIG. 1 as an area extending a distance around the host computing system 100. The distance may be determined by the signal strength of the first wireless networking device 108 or by other suitable methods. In examples, the distances may vary, and may be 5 feet, 10 feet, 20 feet, 25 feet, 40 feet, or other suitable distances. If the user computing system 130 is outside the physical proximity 150, the user computing device 130 will be unable to form a secure connection 132 with the host computing system 100.

The first secure connection 132 may establish a network, such as an ad hoc network, between the host computing system 100 and the user computing system 130. Information is transmitted between the host computing system 100 and the user computing system 130 securely, such as through a remote desktop protocol session, a virtual private network session, or another suitable secure method.

Once the secure connection 132 is establishing between the user computing system 130 and the host computing system 100, the host computing system 100 provides an operating system session to the user computing system 130 through the secure connection 132. This may occur while the user computing system 130 is in physical proximity 150 to the host computing system 100 and may terminate if the user computing system 130 travels outside the physical proximity 150.

In one example, the operating system session may be a Microsoft® Windows® operating system session if the host computing system 100 runs the Microsoft® Windows® operating system. In this way, the user of the user computing device 130 may interact with the host computing device 100 using the operating system session. The operating system session provides a secure, familiar, and compatible session experience for the user to access his data, which may be stored in data store 106 of the host computing system 100. When the user computing device 130 travels outside the physical proximity 150, the secure connection 132 may terminate, thereby also terminating the operating system session and access to the user data.

In examples, the user data may be synchronized or updated from time to time through an enterprise environment such as remote computing system 140. The remote computing system 140 may include any appropriate type of computing device, including for example smartphones, tablets, desktops, laptops, workstations, servers, smart monitors, smart televisions, digital signage, scientific instruments, retail point of sale devices, video walls, imaging devices, peripherals, or the like. In some examples, the remote computing system 140 represents an enterprise environment having a collection of workstations, servers, networking equipment, and other computing devices that make up the enterprise environment. In the example shown in FIG. 1, the remote computing system 140 is outside the physical proximity 150 (i.e., in a remote physical location to the host computing system 100; however, this need not be the case in other examples.

The remote computing system 140 may be wirelessly communicatively coupleable to the host computing system through a second secure connection 142 via the second wireless network device 110 of the host computing system 100. The second secure connection 142 may be established over a cellular or mobile network, such as a GSM network or a CDMA network. Other suitable types of networks, such as Ethernet, WiFi, WMAX, WAN, etc. may also be utilized.

As used through the disclosure, the networks formed through the secure connections 132 and 142 represent generally hardware components and computers interconnected by communications channels that allow sharing of resources and information. The networks may include a cable, wireless, fiber optic, and/or remote connection via a telecommunication link, an infrared link, a radio frequency link, or any other connectors or systems that provide electronic communication. The networks may include, at least in part, an Intranet, the internet, or a combination of both. The networks may also include intermediate proxies, routers, switches, load balancers, and the like.

Figure 2:
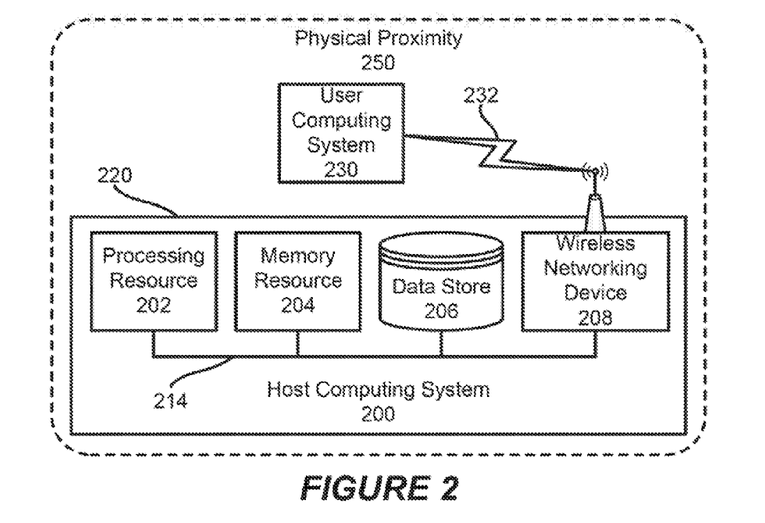
FIG. 2 illustrates a block diagram of a host computing system for wirelessly providing an operating system session to a user computing system in physical proximity to the host computing system via a secure connection according to examples of the present disclosure.

FIG. 2 illustrates a block diagram of a host computing system 200 for wirelessly providing an operating system session to a user computing system 230 in physical proximity 250 to the host computing system via a secure connection 232 according to examples of the present disclosure.

FIG. 2 includes particular components, modules, etc. according to various examples. However, in different implementations, more, fewer, and/or other components, modules, arrangements of components/modules, etc. may be used according to the teachings described herein. In addition, various components, modules, etc, described herein may be implemented as software modules, hardware modules, special-purpose hardware (e.g., application specific hardware, application specific integrated circuits (ASICs), embedded controllers, hardwired circuitry, etc.), or some combination of these.

The host computing system 200 may include a processing resource 202 that represents generally any suitable type or form of processing unit or units capable of processing data or interpreting and executing instructions. The instructions may be stored on a non-transitory tangible computer-readable storage medium, such as memory resource 204, or on a separate device (not shown), or on any other type of volatile or non-volatile memory that stores instructions to cause a programmable processor to perform the techniques described herein. Alternatively or additionally, the host computing system 100 may include dedicated hardware, such as integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein, in some implementations, multiple processors may be used, as appropriate, along with multiple memories and/or types of memory.

In addition to the processing resource 202 and the memory resource 204, the host computing system 200 may include a data store 206 for storing a variety of data. For example, the data store 206 stores user data relating to the user of the user computing system 230. The user data may include emails, documents, photographs, and other data associated with the user of the user computing system 230. In addition, the data store 206 stores an operating system that is executable by the processing resource 202. For example, the data store 206 may include data and instructions that, when executed by the processing resource 202, cause the host computing system 100 to run an operating system session. The operating system may be any one of a number of operating systems, such as a Microsoft® Windows® operating system, an Apple® OS operating system, a Unix or Linux based operating system, Android® operating system, and/or any other suitable operating system.

The host computing system 200 also includes a wireless networking device 208 in the example illustrated in FIG. 2. However, in other examples, a single wireless networking device or additional networking devices may be utilized. In the example shown, the wireless networking device 208 facilitates a secure connection 232 to the user computing system 230.

The components described as making up the host computing system 200 (e.g., the processing resource 202, the memory resource 204, the data store 206, and the wireless networking device 208) are electronically coupled such as through wires, cabling, and/or electronic circuitry via a system bus 214 that may include a data bus to carry information, an address bus to determine where information should be sent, and a control bus to determine operation. In other examples, individual buses may be utilized rather than a combined system bus, and the term "system bus" should not be construed as limiting the type of bus or buses utilized in connecting the components of the host computing system.

The components making up the host computing system 200 are housed in a case 220 having no communications ports. In other words, no communications devices such as optical drives, USB devices including USB memory devices, display devices, input devices such as a keyboard or mouse, imaging device such as a printer or other similar communications devices can physically connect to the host computing system 200. However, in examples, certain of these devices may connect to the host computing system 200 wirelessly, such as through the wireless networking device 108 or other additional networking devices. By preventing such devices from physically connecting to the host computing system 200, the host computing system can be manufactured more economically, has less ports/parts that can break, and is more secure because unauthorized devices have no way of connecting to the host computing system 200.

In an example, the host computing system 200 includes a battery (not shown), which may be charged through a power port on the host computing system 200. However, the power port does not act as a communications port and is used merely to power and/or charge the host computing system 200.

A user computing system 230 that is in physical proximity 250 to the host computing system 200 is wirelessly communicatively coupleable to the host computing system 200. It should be understood that the user computing system 230 may include any appropriate type of computing device, including for example smartphones, tablets, desktops, laptops, workstations, servers, smart monitors, smart televisions, digital signage, scientific instruments, retail point of sale devices, video walls, imaging devices, peripherals, or the like. The user computing system 230 may include an operating system, such as Android®, Microsoft® Windows®, Apple® iOS®, or another suitable operating system.

The user computing system 230 connects wirelessly to the host computing system 200 via the first wireless networking device 208 of the host computing system 200 using a first secure connection. A user of the user computing system 200 may request the first secure connection with the host computing system 230. However, in other examples, such a request may occur automatically rather than at the request of the user. Once the request is received by the host computing system 200, the host computing system 200 establishes the first secure connection 232 to the user computing system 230 via the first wireless networking device 208.

In order to establish the secure connection 232, the user computing system 230 should be in a physical proximity 250 to the host computing system 100. The physical proximity 250 is shown in FIG. 2 as an area extending a distance around the host computing system 200. The distance may be determined by the signal strength of the first wireless networking device 208 or by other suitable methods. In examples, the distances may vary, and may be 5 feet, 10 feet, 20 feet, 25 feet, 40 feet, or other suitable distances. If the user computing system 230 is outside the physical proximity 250, the user computing device 130 will be unable to form a secure connection 232 with the host computing system 200.

The first secure connection 232 may establish a network, such as an ad hoc network, between the host computing system 200 and the user computing system 230. Information is transmitted between the host computing system 200 and the user computing system 230 securely, such as through a remote desktop protocol session, a virtual private network session, or another suitable secure method.

Once the secure connection 232 is establishing between the user computing system 230 and the host computing system 200, the host computing system 200 provides an operating system session to the user computing system 230 through the secure connection 232. This may occur while the user computing system 230 is in physical proximity 250 to the host computing system 200 and may terminate if the user computing system 230 travels outside the physical proximity 250.

In one example, the operating system session may be a Microsoft® Windows® operating system session if the host computing system 200 runs the Microsoft® Windows® operating system. In this way, the user of the user computing device 230 may interact with the host computing device 200 using the operating system session. The operating system session provides a secure, familiar, and compatible session experience for the user to access his data, which may be stored in data store 206 of the host computing system 200. When the user computing device 230 travels outside the physical proximity 250, the secure connection 232 may terminate, thereby also terminating the operating system session and access to the user data.

In examples, the user data may be synchronized or updated from time to time through an enterprise environment such as a remote computing system (not shown). The remote computing system may include any appropriate type of computing device, including for example smartphones, tablets, desktops, laptops, workstations, servers, smart monitors, smart televisions, digital signage, scientific instruments, retail point of sale devices, video walls, imaging devices, peripherals, or the like. In some examples, the remote computing system represents an enterprise environment having a collection of workstations, servers, networking equipment, and other computing devices that make up the enterprise environment.

The remote computing system may be wirelessly communicatively coupleable to the host computing system through a second secure connection via the second wireless network device of the host computing system 100. The second secure connection may be established over a cellular or mobile network, such as a GSM network or a CDMA network. Other suitable types of networks, such as Ethernet, WiFi, WMAX, WAN, etc. may also be utilized.

As used through the disclosure, the networks formed through the secure connection (such as secure connection 232) represent generally hardware components and computers interconnected by communications channels that allow sharing of resources and information. The networks may include a cable, wireless, fiber optic, and/or remote connection via a telecommunication link, an infrared link, a radio frequency link, or any other connectors or systems that provide electronic communication. The networks may include, at least in part, an Intranet, the internet, or a combination of both. The networks may also include intermediate proxies, routers, switches, load balancers, and the like.

Figure 3A:
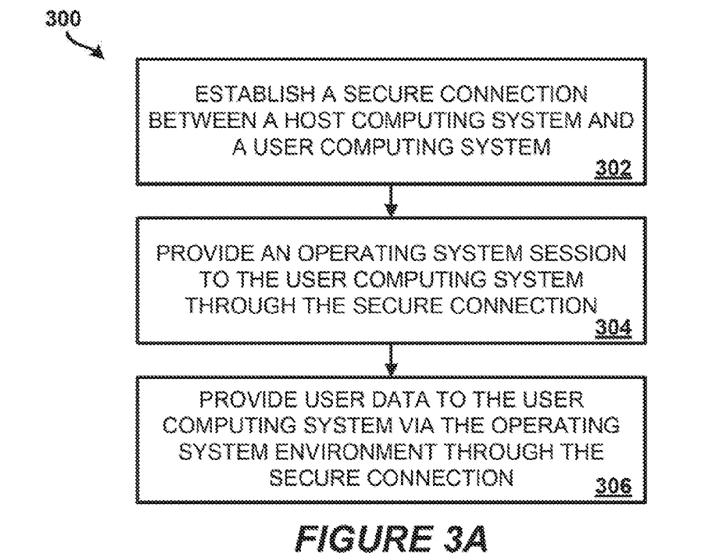
FIGS. 3A and 3B illustrate flow diagrams of a method for wirelessly providing an operating system session to a user computing system in physical proximity to the host computing system via a secure connection according to examples of the present disclosure.
Figure 3B:
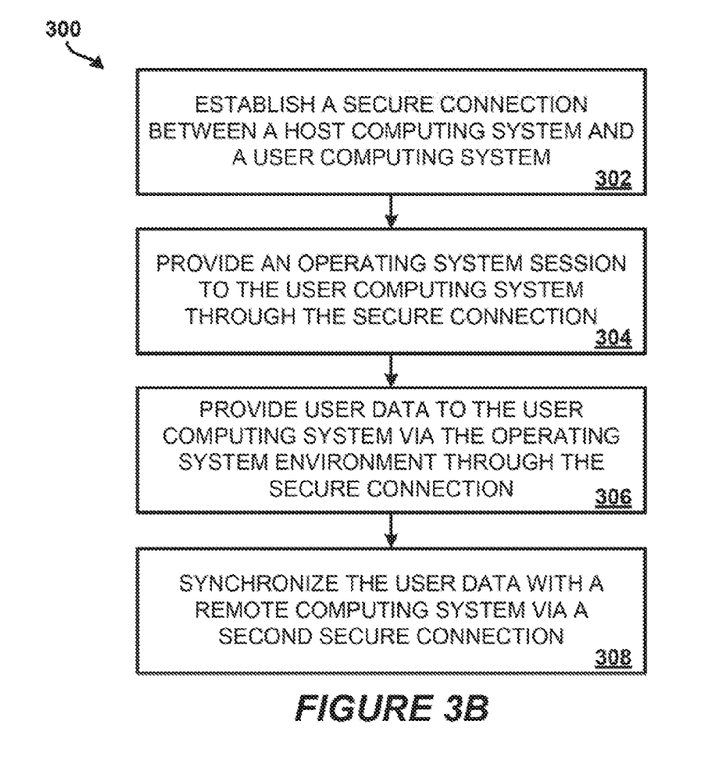

FIGS. 3A and 3B illustrate flow diagrams of a method 300 for wirelessly providing an operating system session to a user computing system in physical proximity to the host computing system via a secure connection according to examples of the present disclosure. The method 300 may be executed by a computing system or a computing device such as host computing system 100 of FIG. 1 and/or host computing system 200 of FIG. 2.

In examples, method 300 may include: establishing a secure connection between a host computing system and a user computing system (block 302); providing an operating system session to the user computing system through the secure connection (block 304); and providing user data to the user computing system via the operating system environment through the secure connection (block 306). In other examples, the method 300 may also include synchronizing the user data with a remote computing system via a second secure connection (block 308).

At block 302, the method 300 may include establishing a secure connection between a host computing system and a user computing system. For example, a host computing system (e.g., host computing system 100 of FIG. 1 and/or host computing system 200 of FIG. 2) establishing a secure connection to a user computing system (e.g., user computing system 130 of FIG. 1 and/or user computing system 230 of FIG. 2) via a wireless network in response to receiving a secure connection request from the user computing system, wherein the host computing system and the user computing system are in physical proximity to each other as described regarding FIGS. 1 and 2. The secure connection may be a remote desktop protocol connection, a virtual private network connection, or other suitable type of connection. The physical proximity may be a distance of 25 feet or less, for example, or may be another suitable distance. The physical proximity may be determined by the range or signal strength of the wireless network. The method 300 continues to block 304.

At block 304, the method 300 may include providing an operating system session to the user computing system through the secure connection. For example, the host computing system (e.g., host computing system 100 of FIG. 1 and/or host computing system 200 of FIG. 2) provides an operating system session to the user computing system (e.g., user computing system 130 of FIG. 1 and/or user computing system 230 of FIG. 2) through the secure connection while the host computing system and the user computing system remain in physical proximity to each other, wherein the operating system is stored on and executable by the host computing system as described regarding FIGS. 1 and 2. The method 300 continues to block 306.

At block 306, the method 300 may include providing user data to the user computing system via the operating system environment through the secure connection. For example, the host computing system (e.g., host computing system 100 of FIG. 1 and/or host computing system 200 of FIG. 2) provides data associated with a user of the user computing system (e.g., user computing system 130 of FIG. 1 and/or user computing system 230 of FIG. 2) to the user computing system via the operating system session through the secure connection, wherein the data associated with the user of the user computing device is stored in a data store of the host computing system In some examples such as illustrated in FIG. 3B, the method 300 may also include synchronizing the user data with a remote computing system via a second secure connection. For example, the host computing system (e.g., host computing system 100 of FIG. 1 and/or host computing system 200 of FIG. 2) synchronizes the data associated with the user with a remote computing system (e.g., remote computing system 140 of FIG. 1) via a second secure connection, the remote computing system being in remote physical location to the host computing system. In examples, the second secure connection is a virtual private network connection or other suitable type of connection.

Additional processes also may be included, and it should be understood that the processes depicted in FIGS. 3A and 3B represent illustrations, and that other processes may be added or existing processes may be removed, modified, or rearranged without departing from the scope and spirit of the present disclosure.

Figure 4:
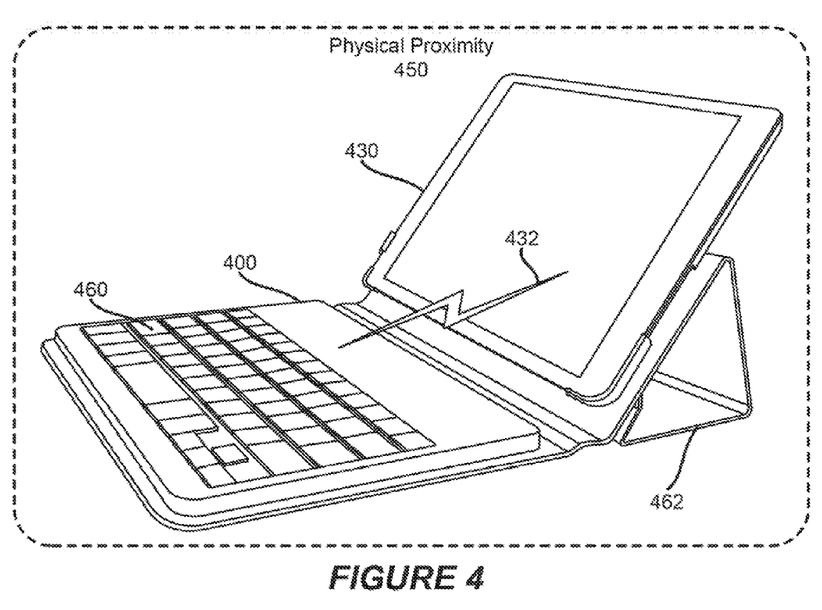
FIG. 4 illustrates a block diagram of a host computing system for wirelessly providing an operating system session to a user computing system in physical proximity to the host computing system via a secure connection according to examples of the present disclosure.

FIG. 4 illustrates a block diagram of a host computing system 400 for wirelessly providing an operating system session to a user computing system 430 in physical proximity 450 to the host computing system 400 via a secure connection according to examples of the present disclosure. The example illustrated in FIG. 4 is a particular implementation of the systems, methods, devices, and techniques described herein.

In this example, the host computing system 400 and the user computing system 430 are physically connected to a case 462. However, the host computing system 400 and the user computing system 430 need not be otherwise physically connected, and the case is merely a convenient way to store the two systems together. However, the host computing system 400 and the user computing system 430 are in a physical proximity 450 to each other.

The host computing system 400 may include all of the elements as described in FIGS. 1 and 2 relating to the host computing system 100 and 200 respectively. For example, although not shown, the host computing system 400 may include at least a processing resource, a memory resource, a data store, and a wireless networking device. Other elements may also be included as described herein. In the example shown in FIG. 4, the host computing system 400 includes a keyboard 460 for inputting information. In one example, the keyboard 460 may be used to input information directly onto the user computing system 430 regardless of whether a secure connection 432 is established between the host computing system 400 and the user computing system 430. In other words, the keyboard 460 may connect directly to the user computing system 430 for the purposes of inputting information, such as via a wireless connection (e.g., Bluetooth, WiFi, radio frequency, infrared, or other wireless connection types).

In other examples, when the secure connection 432 is established between the host computing system 400 and the user computing system 430, the keyboard 430 may be utilized to input information onto the host computing system 400 via the operating system session provided to the user computing system 430 by the host computing system 400.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A method comprising:
establishing, by a host computing system, a first secure connection to a user mobile computing system via an ad hoc network in response to receiving a secure connection request from the user mobile computing system, wherein the host computing system and the user mobile computing system are in physical proximity to each other, the physical proximity is a distance of 25 feet or less in an enterprise environment, wherein the host computing system is housed in a case having no physical ports, and is powered by a battery;

providing, by the host computing system, an operating system session to the user mobile computing system via a remote desktop protocol session to allow the user mobile computing system to interact with the host computing system to access user data stored in a data store on the host computing system, wherein the operating system session is provided through the first secure connection only while the host computing system and the user mobile computing system remain in physical proximity to each other, wherein the operating system is stored on and executable by the host computing system;

providing, by the host computing system, data associated with a user of the user mobile computing system to the user mobile computing system via the operating system session through the secure connection; and periodically synchronizing, by the host computing system, the data associated with the user with a server via a second secure connection established over a cellular network, the server being in remote physical location to the host computing system.

2. The method of claim 1, wherein the second secure connection is a virtual private network connection.

3. The method of claim 1, wherein the first secure connection is a remote desktop protocol connection.

4. A system comprising:
a host computing system, the host computing system further comprising:
  a battery to power the host computing system,
  a processing resource,
  a memory resource,
  a data store to store user data an operating system, and
  a first wireless networking device and a second wireless networking device, wherein the processing resource, the memory resource, the data store, the first wireless network device, and second wireless networking device are electronically coupled via a system bus; and
wherein the host computing system is housed in a case having no physical communications ports;
a user mobile computing system, wherein when the user mobile computing system is in physical proximity to the host computing system in an enterprise environment and is wirelessly communicatively coupled to the host computing system via an ad hoc network through a secure connection via the first wireless networking device of the host computing system, wherein an operating system session is provided to the user mobile computing system via a remote desktop protocol session only while the user mobile computing system remains in physical proximity to the host computing system to allow the user mobile computing system to interact with the host computing system to access the user data stored in the data store on the host computing system, wherein the physical proximity is a distance of 25 feet or less; and a server in remote physical location to the host computing system, and is wirelessly communicatively coupled to the host computing system through a second secure connection established over a cellular network via the second wireless network device of the host computing system to periodically synchronize the user data with the remote computing system via the second secure connection.

5. The system of claim 4, wherein the user data is not available to the user mobile computing system outside the operating system session.

6. The system of claim 4, wherein the second secure connection is established over the cellular network selected from a group consisting of a global system for mobile communications (GSM) network and a code division multiple access (CDMA) network.

7. A host computing system comprising:
a battery to power the host computing system;
a processing resource;
a memory resource;
a data store to store user data and an operating system;
a first wireless networking device; and
a second wireless networking device to connect the computing system to a server via a cellular network, wherein the computing system periodically synchronizes the user data with the server via a second secure connection, server being in a remote physical location to the host computing system,
wherein the battery, the processing resource, the memory resource, the data store, and the wireless network device are electronically coupled via a system bus and are housed in a case having no communications ports, wherein the host computing system is wirelessly communicatively coupled to a user mobile computing system in physical proximity to the host computing system via an ad hoc network through a secure connection via the first wireless networking device, wherein the physical proximity is a distance of 25 feet or less in an enterprise environment, wherein an operating system session is provided to the user mobile computing system through the secure connection between the user mobile computing system and the first wireless networking device of the host computing system via a remote desktop protocol session to allow the user mobile computing system to interact with the host computing system to access the user data stored in the data store on the host computing system, wherein the user data is only available to the the user mobile computing device through the operating system session while the user mobile computing device remains in physical proximity to the host computing system.

8. The computing system of claim 7, wherein the cellular network is selected from a group consisting of a global system for mobile communications (GSM) network and a code division multiple access (CDMA) network.

9. The computing system of claim 7, wherein the user data is not available to the user computing system outside the operating system session.

* * * * *

UNITED STATES PATENT AND TRADEMARK OFFICE
CERTIFICATE OF CORRECTION

PATENT NO. : 10,382,399 B2
APPLICATION NO. : 15/124653
DATED : August 13, 2019
INVENTOR(S) : Kent E Biggs et al.

Page 1 of 1

It is certified that error appears in the above-identified patent and that said Letters Patent is hereby corrected as shown below:

In the Claims

Column 12, Line 47, Claim 7, after "the" delete "the".

Signed and Sealed this
Nineteenth Day of November, 2019

Andrei Iancu
*Director of the United States Patent and Trademark Office*